Figure 8:
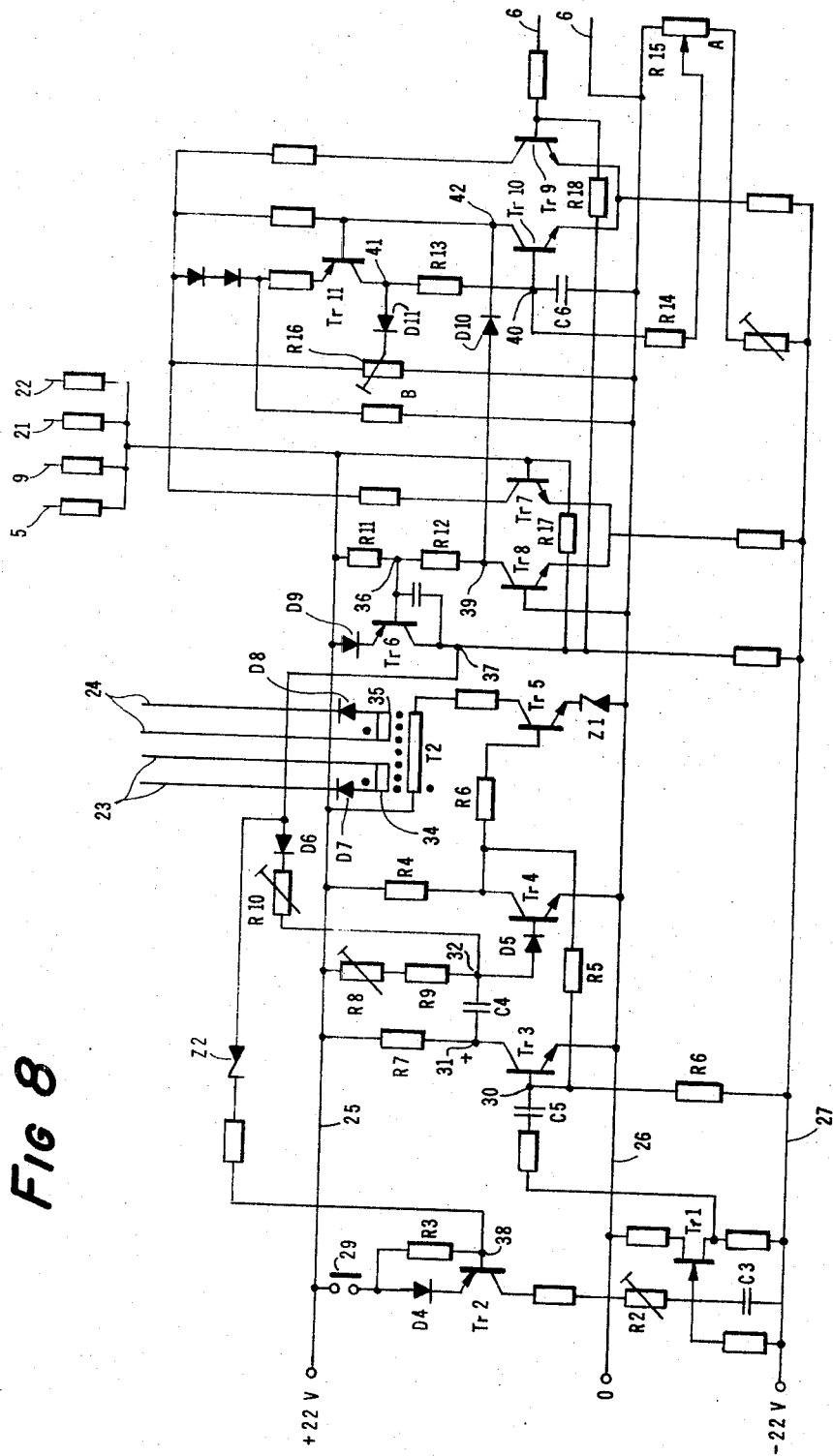

United States Patent [19]
Petersen

[11] 3,833,848
[45] Sept. 3, 1974

[54] D.C.-FED REGULATED DIRECT-CURRENT SUPPLY

[75] Inventor: Tom Kastrup Petersen, Nordborg, Denmark

[73] Assignee: Danfoss A/S, Nordborg, Denmark

[22] Filed: Jan. 27, 1972

[21] Appl. No.: 221,452

Related U.S. Application Data

[63] Continuation of Ser. No. 792,622, Jan. 21, 1969, abandoned.

[30] Foreign Application Priority Data
Jan. 23, 1968    Germany............................ 1638008

[52] U.S. Cl.................................... 321/19, 321/9 A
[51] Int. Cl. .............................................. H02m 1/08
[58] Field of Search .................. 321/9 A, 18, 19, 45

[56] References Cited
UNITED STATES PATENTS
3,226,630  12/1965  Lampke............................... 321/9 A Primary Examiner—William M. Shoop, Jr.

[57]    ABSTRACT

The invention relates to a D.C.-fed regulated direct current voltage supply for feeding an inverted converter connected to a three phase motor. The voltage supply has current sensing means to which is connected voltage regulating means. The voltage regulating means is responsive to a maximum predetermined current value to reduce the voltage to prevent the current from exceeding the predetermined value. The voltage regulating means includes an SCR or equivalent which is opened and closed by impulses. The open and/or closed periods are of varying duration to prevent the current from exceeding the predetermined value.

5 Claims, 8 Drawing Figures

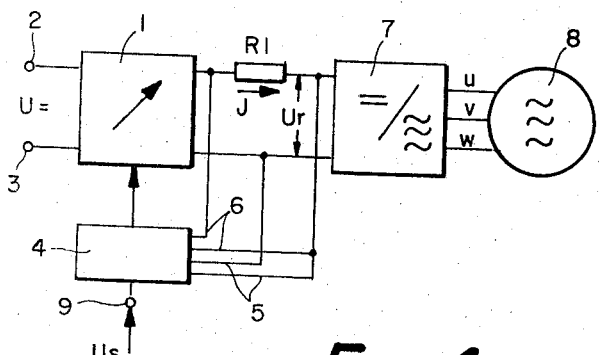
Fig 1
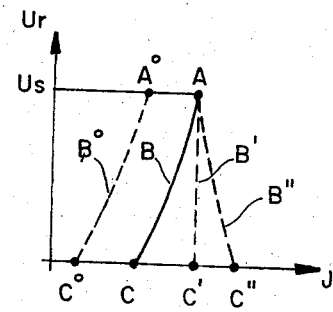
Fig 2
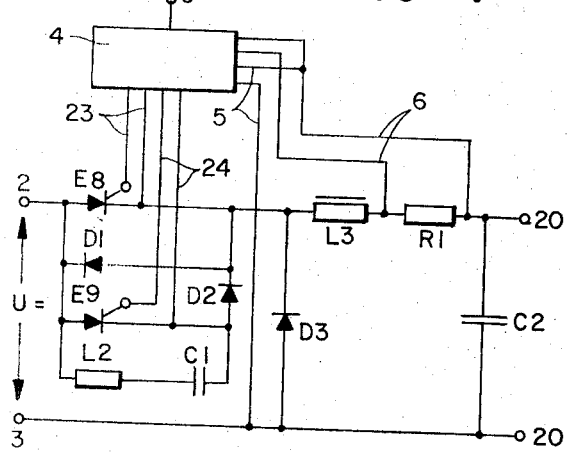
Fig 4
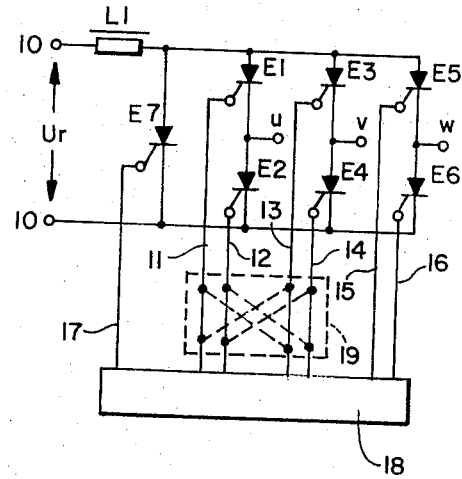
Fig 3
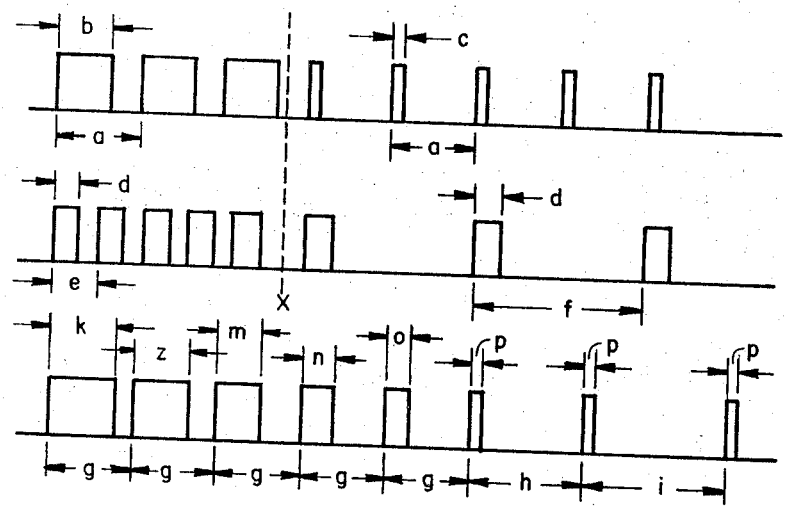
Fig 5
Fig 6
Fig 7

D.C.-FED REGULATED DIRECT-CURRENT SUPPLY

This is a continuation, of application Ser. No. 792,622, filed 1-21-69, now abandoned.

The invention relates to a D.C.-fed regulated direct-current supply, particularly for feeding an inverted converter in which supply the voltage is regulated in dependence upon a factor of the connected load.

Direct-current supply systems of this kind are known, which are controlled, in dependence upon voltage, in such a manner that an approximately constant voltage is maintained at the load. There are various possible ways of regulating the direct-current supply. In one known case the constant input voltage is passed to a regulable bridge, at the output of which the regulated direct-current voltage can be picked up. In another case, a transistor is contained in the direct-current voltage line, which transistor is rendered conductive with constant frequency and the cut-in period of which is regulated, a filter element, connected at the outlet side, producing a mean value from these D.C. voltage impulses.

In many items of electrical equipment there arises the problem of overloading. In particular, semi-conductor switching elements, such as controlled inverted converters, are very quickly exposed to the danger of destruction if subjected to overloading. For this reason, in the case of inverted converters, for example, it has been necessary to employ a basic rating of the controlled inverted converters used therein such that they can withstand any excess current expected to occur in service. Despite this, it has not been possible to prevent destruction if, as a result of an error in control, two series-connected rectifiers were simultaneously rendered conductive and short-circuiting occurred as a result.

Similar problems also arise in the case of the regulated direct-current voltage supply system itself. All the components through which the direct-current passes have to be so rated that they can deal with any excess current expected to occur in service. Nevertheless, it has not hitherto been possible to use a controlled rectifier for the purpose of the regulation, because this would have been destroyed by the short-circuit current if short-circuiting occurred at the output of the D.-C. voltage supply system.

The object of the invention is to indicate a way whereby the endangering of the components due to excess current can be avoided in a simple manner.

According to the invention, this object is achieved by constituting the initially-described direct-current voltage supply system in such a way that, upon a limiting value for the loading current being exceeded, the voltage is reduced to an extend such that the loading current does not exceed a prescribed maximum value.

By intervening in this manner in the regulating mechanism of the direct-current voltage supply system, a switching means is obtained that is completely protected against overload. Up to the point at which the limiting value of the loading current is reached, the regulation can be carried out in a perfectly normal manner. Only when this limiting value is exceeded, is it necessary for the loaded safety mechanism to come into action. Even short-circuiting, that is, the most dangerous form of overloading, then has no disadvantageous consequences, since the current permitted to pass through from the D.C. voltage supply system and thus the current flowing through the loaded equipment cannot exceed a predetermined maximum short-circuiting value. All the components employed can be of such low rating that they are just able to deal with the prescribed maximum current value. They can therefore be considerably less expensive than the elements hitherto employed which had hitherto to be basically excessively large in order to provide protection against possible overloading.

In this connexion, particularly suitable for the direct-current supply is a known circuit comprising a controlled element for letting the supplied direct-current voltage through, which element is opened by impulses of a duration dependent upon the desired voltage. Since, here, the desired intervention can take place with the next impulse, rapid reaction to any excess currents that occur is ensured. Furthermore, for the first time in such a circuit, use can be made of a controlled rectifier which thus does not itself have a current-limiting effect, since the danger of overloading no longer exists.

Instead of, or in addition to this, the controlled element for letting through the supplied voltage can also be controlled in such a way that it is opened by impulses the spacing of which is dependent upon the desired voltage. The regulation of the spacing of frequency of the impulses offers the advantage that the voltage value can be reduced practically to zero, while the voltage does not fall below a certain minimum value during regulation of the duration of the impulses.

According to the invention, a particularly advantageous possible application is to be seen in the combination of a three-phase motor connected to an inverted converter, the direction of rotation of which motor is reversible by interchanging two phases. If, in the normal way, the direction of rotation of a running motor is reversed by phase-interchange, a very heavy current results. Consequently, it has hitherto been necessary to stop the motor and then to start it up again in the opposite direction. In contrast to this, the interchange of phases now has no disadvantageous consequences whatsoever, since the current is automatically held below a prescribed maximum value.

The phase-interchange for reversing the direction of rotation does not need to take place at the outlet of the inverted converter; rather, it suffices if the controlled rectifiers of the inverted converter are switched over in the sense of a phase-interchange.

The invention will now be described in more detail by reference to an embodiment illustrated in the drawing, wherein:

FIG. 1 is a schematic illustration of an inverted converter circuit with the direct-current voltage supply system, FIG. 2 is a current-voltage diagram, FIG. 3 is a schematic circuit of the inverted converter, FIG. 4 shows a circuit for the controlled direct-current voltage supply system, FIG. 5 is an impulse-time diagram in the case of a regulable length of impulse, FIG. 6 is an impulse-time diagram in the case of a regulable interval between inpulses, FIG. 7 is an impulse-time diagram in the case of regulable length and regulable spacing of the impulses, and FIG. 8 is a circuit diagram for the equipment controlling the rectifiers of the direct-current voltage supply system.

A regulable direct-current supply system 1 is supplied with a constant direct-current voltage $U_=$ by way of the input terminals 2 and 3. This direct-current voltage can be derived from an alternating-current mains supply by way of a three-phase rectifier bridge, for example. The direct-current voltage supply system is controlled by a control means 4, which, on the one hand, is acted upon, by way of the conductors 5, by the output voltage $U_r$ of the direct-current voltage supply system 1, and, on the other hand, by way of conductors 6, by the voltage-drop at a resistor R1, contained in the main current path, i.e. by the loading current I. An inverted converter 7, is acted upon by the regulated direct-current voltage, and this converter in turn feeds a polyphase induction motor 8. Also, a voltage of nominal value is fed to the control means 4 at the output 9.

In operation, the control means 4 provides for the regulated voltage $U_r$ being maintained at the level of the nominal value $U_s$, which is normally adjustable. The control means 4 seeks to provide a counter-compensation even at heavier currents, so as to ensure that the voltage is constant. If, however, a limiting value A for the loading current I is reached, the control means 4 regulates the voltage $U_r$ along the line B and reduces it to an extent such that in the case of short-circuiting only the prescribed permanent current flows through the point C. For a like limiting value A, the curve B can follow the path B', wherein the value C' is equal to the value A, or it can follow a path B'', wherein the value C'' is greater than the value A. If the limiting value is shifted to the point $A^0$, the associated curve can take the path $B^0$, so that the end value is $C^0$.

It follows from this, that in the normal case the limiting value of the loading current, upon the exceeding of which the voltage is to be regulated to a lower level, is at the same time also the prescribed maximum value that the current should not exceed. Only in the case of curve B'' is the maximum value C'' somewhat greater than the limiting value A, but it is always still smaller, by a multiple, than the short-circuiting current occurring under normal conditions. Curve B is the more advantageous, since the permanent current C has a relatively small value. Intermediate values can, of course, also occur on the illustrated curves B given appropriate voltage and loading conditions.

FIG. 3 is a schematic illustration of an inverted converter, at the input terminal 10 of which is applied the regulated direct-current voltage $U_r$. It comprises six controllable rectifiers E1-E6, which are connected in series in pairs and between each pair of which there is branched a phase U, V and W of the three-phase mains supply. A quenching rectifier E7 is common to all the rectifiers. Also provided is a short-circuit impedance L1. The individual rectifiers are connected, by way of control leads 11 – 17, to an impulse generator 18, which supplies the rectifiers E1 – E6 with striking impulses in the correct time-sequence, and a quenching rectifier E7 with quenching impulses. The quenching impulses occur at a frequency six times as great as the frequency required in the alternating-current mains supply. As soon as the quenching rectifier E7 is struck, the voltage thereat breaks down and the conducting rectifiers E1 – E6 are quenched. Immediately thereafter the rectifier E7 is again blocked by a quenching circuit, not illustrated. Those rectifiers, the opening phase of which has not yet terminated, are immediately struck again by a fresh striking impulses.

A switch-over means 19, which is indicated only schematically shows that the pairs of striking impulse leads 11, 12 and 13, 14 can be interchanged. This interchanging leads to an interchange of the phases U and V of the alternating-current mains supply and thus to reversal of the direction of rotation of the motor 8.

FIG. 4 illustrates a connexion diagram for a direct-current voltage supply system 1. A controllable rectifier E8 is contained in one supply line. Connected in parallel therewith is a rectifier D1, a further controllable rectifier E9 and the series connexion comprising a rotary choke L2 and a commutating condenser C1. Also connected between the rectifiers D1 and E9 is a rectifier D2.

The controllable rectifier E8 forms a switch, which is rendered conductive when a striking impulse occurs. The remaining parts serve as a quenching circuit. The condenser C1 will have been charged by the direct-current voltage for as long as the rectifier E8 has been blocked. It maintains this condition until the quenching rectifier E9 receives a quenching impulse. It is then discharged by way of the rotary choke L2 and the rectifier E9, whereupon an inverse voltage occurs which quenches both the rectifier E8 and the rectifier E9. The condenser C1 can then be recharged again through the rectifiers D2 and D1, losses from the direct-current mains being thereby covered.

Connected at the outlet side of this switch is a filter which consists of a shunt rectifier D3, a series choke L3 in series with the metering resistor R1, and a shunt condenser C2. This filter provides a mean value from the direct-current voltage impulses let through by the switch E8, which mean value can be picked up at the output terminals 20 which are connected to the equipment to be loaded, e.g., the input terminals 10 of the inverted converter 7.

FIG. 5 shows a mode of operation of the controlled rectifier E8, wherein it is struck at a prescribed frequency, i.e. at the same time interval $a$, but is quenched after different durations of impulse. Let it be assumed that at the moment X, the current limiting value A has been reached. Prior to this the impulses had a length $b$. Thereafter they are reduced to the length $c$. Consequently, the mean value for voltage is very much smaller subsequent to the moment X than before it.

FIG. 6 is based on each of the impulses, let through by the rectifier E8, being of the same length $d$. The voltage is regulated by changing the spacing of the impulses. Prior to the moment X, the interval $e$ is small and after the moment X the interval $f$ is great. In this way, too, the mean value for voltage can be very considerably reduced after reaching the limiting value A.

FIG. 7 illustrates a combination of these two possibilities. The value for voltage is gradually reduced from left to right. The first impulses occur at like intervals $g$, whereas the later impulses increase in their spacing to $h$ and $i$. On the other hand, the length of the first impulses is reduced from $k$ to $p$ and then remains constant at this minimum value.

FIG. 8 shows a connexion diagram for the control means 4, whereby the direct-current voltage supply system 1 is regulated. Apart from comprising the input 5 for the actual voltage value, the input 6 for the loading current and the input 9 for the nominal voltage value, this means also incorporates two further inputs 21 and 22, one of which can serve a slip compensation means for the motor 8 and the other, a special process control means.

Voltages of +22.0 and −22 V are available at three supply conductors 25, 26 and 27. In the drawings, only those constituents of the circuit mentioned in the following description are provided with reference numerals.

Using a uni-junction transistor Tr1, a frequency emitter is constructed by way of which a charging condenser C3 is always discharged and sends an impulse to the output of the transistor when the latter is charged to a prescribed voltage value. As charging resistors for this condenser, use is made, inter alia, of a setting resistor R2 and a transistor Tr2, the base of which is connected to the emitter through a resistor R3 and in the emitter lead of which are connected a mains switch 29 and a rectifier D4. The frequency emitter so far described is set in such manner that it gives out impulses having a constant repetition frequency of about 1 kilocycle.

A monostable multi-vibrator comprises two transistors Tr3 and Tr4. Between the collector of the first transistor Tr3 and the base of the second transistor Tr4 is connected an impulse-length condenser C4 and a rectifier D5. Normally, the second transistor Tr4 is conducting, so that there occurs at the resistor R4 a voltage-drop which, taking into account the resistors R5 and R6, keeps the base potential of the first transistor Tr3 so low at the point 30 that this is blocked. In the meantime, the condenser 4 is charged by way of the resistor R7 to an extent such that the point 31 is positively biased relatively to the point 32. If an impulse is now passed from the frequency emitter through the condenser C5 to the base of the transistor Tr3, so that the latter becomes conducting, the collector current flows through the resistor R7, whereupon the potential at the point 31 drops to a considerable extent. The potential at the point 32 drops correspondingly lower, so that the transistor Tr4 is blocked. This condition is maintained until the condenser C4 has recharged through the resistor R7, the adjustable resistor R8 and the resistor R9 to an extent such that the point 32 has reached a potential that again renders the transistor Tr4 conducting. In parallel with the resistors R8 and R9 is a branch containing an adjustable resistor R10 and a diode D6, through which branch the condenser C4 can likewise discharge and which will be described in more detail later on.

The transistor Tr4 controls the base of a transistor Tr5, the emitter of which is connected by way of a Zener diode Z1 to the neutral conductor, and the collector of which is connected to the lead 25 through the secondary winding 33 of a transformer T2. The two primary windings 34 and 35 are each provided with a rectifier D7 and D8, so that they send the required striking and quenching impulses through the conductors 23 and 24. The transistor Tr5 is blocked when the transistor Tr4 is conducting; it is conducting when the transistor Tr4 is blocked. The Zener diode 31 caters for the current through the transistor Tr5 having steep flanks. Each ascending flank results in a striking impulse and each descending flank in a quenching impulse.

A regulating circuit comprises a transistor Tr6 in the emitter lead of which is connected a rectifier D9. The base potential at the point 36 is determined by the current flowing in the resistors R11 and R12. Connected to one side of the collector output 37 of this transistor Tr6 is the branch comprising the diode D6 and the resistor R10 of the condenser C4 constituting the impulse-length emitter and, to the other side, the base of the transistor Tr2 by way of a Zener diode Z2. The resistor of the transistor Tr2, i.e., the voltage at the point 37 therefore ultimately determines the impulse-length and the frequency.

a. Impulse length:

If the transistor Tr6 is blocked, the condenser C4 which determines the length of the impulses is recharged only through the branch comprising the resistors R8 and R9. The setting of the resistor R8 therefore determines the maximum length of impulse. If the transistor Tr6 is fully open, recharging takes place largely through this transistor and the resistor R10. The setting of the resistor R10 therefore determines the minimum length of impulse. The transition from maximum to minimum length of impulse can take place continuously by means of the base voltage of the transistor Tr6.

b. Frequency:

The resistor R3 seeks to hold the base point 38 of the frequency emitter transistor Tr2 at about + 22 V. In normal operation, the output point 37 of the regulating circuit is at so low a potential that the Zener diode Z2 is conducting and, in this way, the base potential at the point 38 drops, so that the transistor Tr2 passes current well. If, however, the transistor Tr6 is opened still further (and the length of the impulse is accordingly still further reduced), then the point 37 acquires a potential at which the Zener diode Z2 blocks. Consequently, the base point 38 is also raised and the transistor Tr2 acquires a high resistance value through which the condenser C3 is charged correspondingly more slowly, and this leads to the required reduction of frequency.

The resistors associated with the four inputs 5, 9, 21 and 22 form a discriminator which is connected to the input point 39 of the regulating circuit by way of a sum-and-difference amplifier having a first transistor Tr7 and a second transistor Tr8. The sum-and-difference amplifier is of asymmetrical design. The discriminator is connected to the base of the first transistor Tr7. The basis of the second transistor Tr8 is connected to neutral. The transistors are connected in a manner complementary to that of the transistor Tr6.

Also, connected to the point 39 by way of a diode 10 is a limiting circuit, which comprises a sum-and-difference amplifier, of very similar design, and having a first transistor Tr9 and a second transistor Tr10. One current-measuring line 6 is connected to the base of the first transistor Tr9. The base of the second transistor Tr10 is connected to the neutral lead 26 by way of a condenser C6. Connected in the output branch of the second transistor Tr10 is a complementary, D.C.-coupled third transistor Tr11, the collector of which is connected, by way of a resistor R13 to the base point 40 of the second transistor Tr10. A constant negative voltage is supplied to the point 40 through a resistor R14 from a voltage divider R15. A voltage divider resistor R16 prevents the potential at the collector point 41 from rising above a prescribed value, a diode D11 being interposed. The bases of the two first transistors Tr7 and Tr9 are connected in opposition to the collector of the regulating transistor Tr6 by way of feedback resistors R17 and R18.

With the help of the discriminator and of the sum-and-difference amplifier associated therewith, the regulating transistor Tr6 can be so controlled that a given initial voltage $U_r$ can be held. The effect of this amplifier is immediately cut off, however, when the other sum-and-difference amplifier comes into action. This is the case when the voltage signal, proportional to the loading current, in the conductor 6 reaches the potential at the point 40, which potential can be adjusted as required to a given maximum loading current. In this case, the current is very considerably amplified through the transistor Tr10, since the condenser C6 is recharged by way of the transistor Tr11 and the potential at the point 40 is thereby raised. This positive feedback is, of course, limited, since the potential at the point 41 cannot fall below the potential determined by the resistor R16. In the condition of equilibrium, the collector at the point 42 then is of such potential that the regulating transistor Tr6 is adjusted to an extent such that the frequency emitter switches over to a lower frequency. This means that when excess current occurs, the frequency immediately drops to an extent such that the initial voltage $U_r$ becomes almost zero and therefore no excess current can adversely affect the circuit elements in the direct-current voltage supply system.

By shifting the tapping at the resistor R15, it is possible to adjust the limiting value A, upon the exceeding of which the voltage is to be downwardly adjusted. By shifting the tapping at the resistor R16, the slope of curve B can be altered, so that different permanent currents C can be set.

I claim:

1. A D.C.-fed regulated direct current voltage regulator for supplying a variable load, comprising an SCR forming a regulating element, control means including a pulse generator for developing a pulse signal, voltage sensing means to sense the voltage supplied to said load, current sensing means to sense the current supplied to said load, said voltage sensing means controlling said pulse generator to develop a pulse control signal which is supplied to said SCR to provide the required voltage regulation under normal conditions by alternately striking and blocking said SCR to provide conduction periods and off periods, said conducting periods being of varying duration to increase or decrease the voltage, and said current sensing means controlling said pulse generator such that under overload conditions said current supplied to said load does not exceed a predetermined maximum value by alternately striking and blocking said SCR to provide conduction periods and off periods, said off periods being of varying duration to increase or decrease the voltage.

2. A D.C.-fed regulated direct current voltage supply according to claim 1 wherein said voltage regulating means includes a controlled intermittent current conducting element, said voltage regulating means including impulse means for alternately striking and blocking said element to provide conduction periods and off periods, said conducting periods being of varying duration to increase or decrease the voltage to prevent said predetermined current value from being exceeded.

3. A D.C.-fed regulated direct current voltage supply accroding to claim 1 wherein said voltage regulating means includes a controlled intermittent current conducting element, said voltage regulating means including impulse means for alternately striking and blocking said element to provide conduction periods and off periods, said off periods being of varying duration to increase or decrease the voltage to prevent said predetermined current value from being exceeded.

4. A D.C.-fed regulated direct current voltage supply according to claim 1 wherein said variable load is a three phase motor, said motor being reversible by interchanging two phase.

5. A D.C.-fed regulated direct current voltage supply accroding to claim 4 wherein said converter includes controlled rectifiers, said rectifiers being reversible to interchange the phases of said motor.

* * * * *